United States Patent
Ruppel et al.

[11] Patent Number: 5,339,730
[45] Date of Patent: Aug. 23, 1994

[54] METHOD FOR PRINTING-EMBOSSING PAPER SHEETS

[75] Inventors: Rémy Ruppel, Durrenentzen; Joël Hungler, Urschenheim; Pierre Laurent, Colmar, all of France

[73] Assignee: Kaysersberg, Kaysersberg, France

[21] Appl. No.: 975,945
[22] PCT Filed: Jun. 29, 1992
[86] PCT No.: PCT/FR92/00605
  § 371 Date: Feb. 23, 1993
  § 102(e) Date: Feb. 23, 1993
[87] PCT Pub. No.: WO93/00219
  PCT Pub. Date: Jan. 7, 1993

[30] Foreign Application Priority Data
Jun. 28, 1991 [FR] France .................. 91 08029

[51] Int. Cl.5 .................................. B31F 1/07
[52] U.S. Cl. .................................. 101/32; 101/23; 156/209
[58] Field of Search .............. 101/22, 23, 32, 5, 6; 156/209, 219, 291, 292; 428/180

[56] References Cited

U.S. PATENT DOCUMENTS

| | | | |
|---|---|---|---|
| 2,746,387 | 5/1956 | Neumann | 101/23 X |
| 3,403,621 | 10/1968 | Simson et al. | 101/23 |
| 3,414,459 | 12/1968 | Wells | 428/180 |
| 3,867,225 | 2/1975 | Nystrand | 156/209 |
| 4,135,962 | 1/1979 | Sinclair et al. | 101/23 X |

FOREIGN PATENT DOCUMENTS

2602999 8/1986 France .
0598442 3/1948 United Kingdom .

Primary Examiner—Edgar S. Burr
Assistant Examiner—Christopher A. Bennett
Attorney, Agent, or Firm—Breiner & Breiner

[57] ABSTRACT

A method for printing and embossing sheets of paper made of cellulose wadding and with two or more plies, characterized in that one of the plies is directly printed on the embossing roller using one or more printing systems mounted on the embossing systems, and in that this ply is associated with another embossed and glue-sized ply to form a sheet in such manner that the print inks are located on the sheet's inner side between the two or more plies.

1 Claim, 1 Drawing Sheet

METHOD FOR PRINTING-EMBOSSING PAPER SHEETS

The present invention concerns a method for printing-embossing paper sheets of cellulose wadding (tissue paper) having two or more plies.

Cellulose wadding products comprising two or more plies are used, in particular, as sanitary paper or general-purpose towels.

The conventional printing procedure for two-ply cellulose wadding of the tip-to-tip type consists in printing the product on its outside by a printing system upstream or downstream of the embossing system.

The major drawback of such a procedure, illustratively found in U.S. Pat. No. 3,414,459, is that the printing ink is located on the product's outside and hence will be in contact with the outside when in use. Moreover, it is impossible to synchronize embossing and printing. Lastly, when printing before embossing, the former interacts with the latter and degraded definition is incurred.

Conventional printing-embossing of two-ply cellulose wadding products of the nested type consists in using the glue-sizing system of the embossing set and in dyeing the glue.

This technique is described for instance in U.S. Pat. No. 3,867,225 and results in products free from printing ink on its outsides, but still subject to many drawbacks, in particular, the dependency of the printing pattern on the embossing pattern (it cannot be easily changed therefore), the dependency of the printing denseness on gluing, and the high capital costs. Moreover, the ink must be miscible with the glue and hence the choice of inks is restricted.

Again, the range of fineness of conventional printing, such as screens or vignettes, is precluded.

The present invention precludes the above drawbacks and offers a printing-embossing method for cellulose wadding papers having two or more plies, and is characterized in that one ply is directly printed on the embossing roller using one or more printing systems mounted on the embossing systems, and in that this ply is associated with another embossed ply and is glue-sized in a manner known per se to form a sheet in such a manner that the printing pigments shall be located on the inner side of the sheet between the two or more plies.

The method of the invention applies as well to tip-to-tip embossing as to nested embossing.

The invention shall be presently described in relation to the attached and illustrative drawings.

Figure 1:
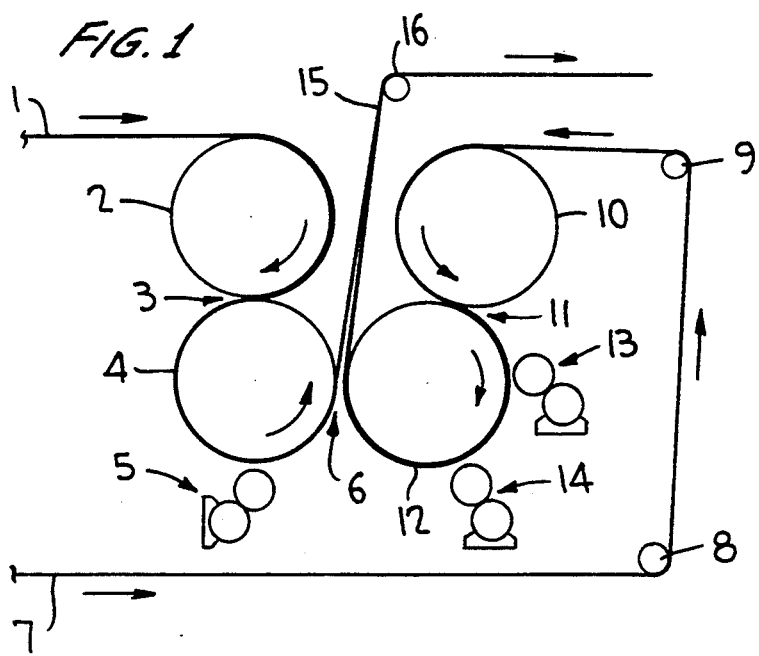
FIG. 1 is a schematic view of equipment with which to carry out a method of the invention for nested printing-embossing of the tip-to-tip type.

With respect to FIG. 1, a tissue ply 1 moves in the direction shown by the arrow and passes round a rubber compression roller 2 into the nip 3 formed between the rubber compression roller 2 and steel embossing roller 4. The tissue ply 1, embossed in the nip 3 and moving round the steel roller 4, is sized by gluing system 5 and moves toward nip 6.

A second tissue ply 7 moves in the direction of the arrow and passes over guide rollers 8 and 9 and then round the rubber compression roller 10 into the nip 11 between the rubber compression roller 10 and the steel embossing roller 12. The tissue ply 7 embossed in the nip 11 moves round the embossing roller 12 and is printed while on the embossing roller 12 in the printing systems 13 and 14. The embossed and printed tissue ply 7 moves toward the nip 6 where it is combined in tip-to-tip manner with the sized and embossed tissue ply 1 to form a sheet 15.

By means of the guide roller 16, the sheet 15 is moved to a subsequent and conventional conversion stage.

The print pigments of the sheet 15 are located on the inner side between the plies 1 and 7.

Figure 2:
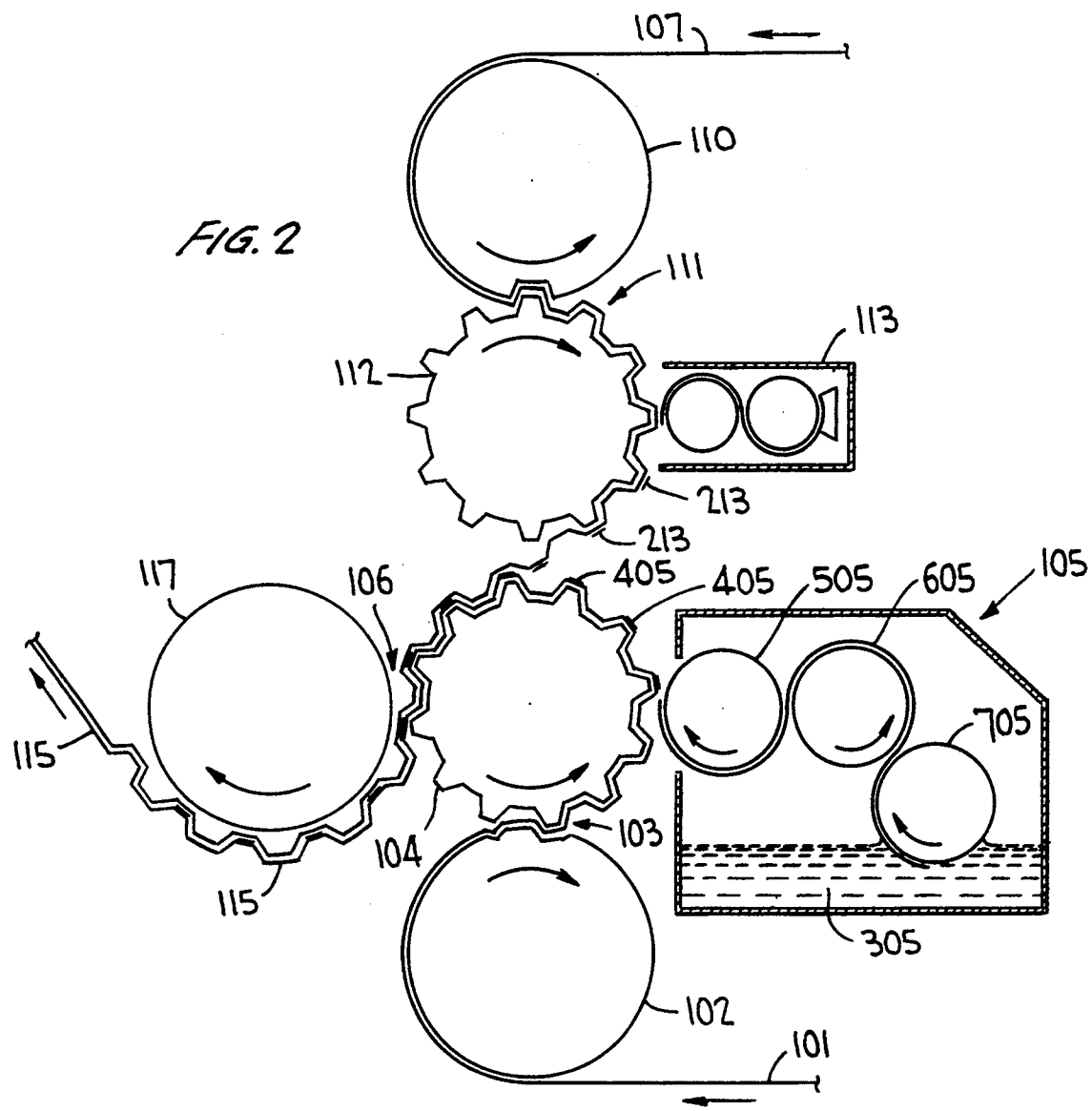
FIG. 2 is a schematic view of equipment for carrying out the method of the invention of the nested printing-embossing type.

As regards FIG. 2, a tissue ply 101 moves in the direction shown by the arrow and passes round a rubber compression roller 102 into the nip 103 formed between the compression roller 102 and the steel embossing roller 104. The tissue ply 101, embossed in the nip 103 and passing round the embossing roller 104, is sized according to 405 at the gluing system 105. The gluing system 105 applying the adhesive 305 comprises a transfer roller 505, a doctor roller 605 and a receiving roller 705 rotating in the direction shown by the arrows.

A second tissue ply 107 moves in the direction indicated by the arrow and round the rubber compression roller 110 into the nip 111 between the compression roller 110 and the steel embossing roller 112, where it will be embossed.

The printing of the embossed tissue ply 107 moving round the embossing roller 112 is carried out on the embossing roller 112 in the printing system 113 according to 213. The embossed and printed tissue ply 107 is moved onto the embossing roller 104 where it is combined in the nip 106 between the embossing roller 104 and the compression roller 117 with the embossed and sized tissue ply 101 into a nested form to constitute the sheet 115.

The print pigments 213 are located on the inner side of the sheet 115 between the plies 101 and 107.

The sheet 115 moves round the compression roller 117 and is then subjected to a conventional subsequent conversion stage.

The advantages of the method of the invention are as follows:
— the printing pigments are deposited on the sheet's inner side between two or more plies and accordingly there is no contact between these pigments and the outside when the sheet is being used;
— there is synchronization between the printing pattern and the embossing pattern procedures, making it possible, for instance, to emphasize an embossing pattern;
— the capital investment is less because of lesser equipment bulk.

Regarding printing where a nested type embossing is concerned, the method of the invention results in improved independence of the print pattern from the embossing pattern and hence in the printing being independent from the glue sizing, so that the product's print intensity can be varied.

We claim:

1. A method for printing and embossing a paper sheet made of two or more plies comprising (1) embossing a first ply by means of a first embossing roller; (2) subsequently printing said first ply while said first ply is present on said first embossing roller by means of at least one printing means positioned in proximity to said first embossing roller; (3) embossing a second ply by means of a second embossing roller; (4) applying adhesive on said second ply; (5) joining said first ply to said second ply to form a sheet wherein said printing on said first ply is located on a side of said first ply which faces said second ply when said first ply is joined to said second ply to form said sheet.

* * * * *